US008894376B2

(12) United States Patent
Penny et al.

(10) Patent No.: US 8,894,376 B2
(45) Date of Patent: Nov. 25, 2014

(54) TURBOMACHINE BLADE WITH TIP FLARE

(75) Inventors: Christopher Michael Penny, Greer, SC (US); Ross James Gustafson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 13/284,521

(22) Filed: Oct. 28, 2011

(65) Prior Publication Data
US 2013/0108452 A1  May 2, 2013

(51) Int. Cl.
F01D 5/14 (2006.01)
F01D 5/20 (2006.01)

(52) U.S. Cl.
CPC ............... F01D 5/141 (2013.01); *Y02T 50/673* (2013.01); F01D 5/20 (2013.01)
USPC .................. 416/238; 416/228; 416/241 R

(58) Field of Classification Search
CPC ...... F05D 2250/712; F01D 5/04; F01D 5/141
USPC ............. 416/228, 243, 238, 241 R
See application file for complete search history.

(56) References Cited

U.S. PATENT DOCUMENTS

| 4,682,935 A | 7/1987 | Martin |
| 5,525,038 A | 6/1996 | Sharma et al. |
| 6,709,233 B2 * | 3/2004 | Haller ........................... 415/192 |
| 6,709,239 B2 | 3/2004 | Chandraker |
| 7,217,101 B2 | 5/2007 | Harvey |
| 7,794,202 B2 * | 9/2010 | Borthwick et al. ........... 415/192 |
| 8,480,372 B2 * | 7/2013 | Sparks .......................... 416/238 |
| 2005/0106027 A1 * | 5/2005 | Harvey ..................... 416/223 R |
| 2008/0273984 A1 | 11/2008 | Liang et al. |
| 2010/0111674 A1 | 5/2010 | Sparks |

FOREIGN PATENT DOCUMENTS

| EP | 0792410 B1 | 1/1999 |
| EP | 1524405 A2 | 4/2005 |
| EP | 1259711 B1 | 8/2005 |
| EP | 1693552 A2 | 8/2006 |
| GB | 2151310 A | 7/1985 |

OTHER PUBLICATIONS

Search Report and Written Opinion from EP Application No. 12190271.2 dated Feb. 13, 2013.

* cited by examiner

Primary Examiner — Ninh H Nguyen
(74) Attorney, Agent, or Firm — Fletcher Yoder, PC

(57) ABSTRACT

Certain embodiments of the present disclosure include a system having a turbomachine including a plurality of turbomachine blades coupled to a rotor, wherein each turbomachine blade has a blade base portion and a flared blade tip portion flared relative to the blade base portion. Additionally, a trailing edge of each turbomachine blade extends along a common plane.

20 Claims, 2 Drawing Sheets

TURBOMACHINE BLADE WITH TIP FLARE

BACKGROUND OF THE INVENTION

The subject matter disclosed herein relates to turbomachines and, more particularly, to a turbomachine blade geometry for improving performance and durability.

Turbine systems include gas turbines, steam turbines, and hydro turbines. In general, a turbine is configured to use turbine blades to extract energy from a fluid flow, such as gas, steam, or water. For instance, the turbine blades may extend radially outwards from a supporting rotor disk, and the turbine blades may force rotation of the rotor disk as the fluid flow passes across the turbine blades. Unfortunately, existing design of turbine blades may provide limited aerodynamic performance. Additionally, improved turbine blade design may be economically impractical. For example, improved turbine blade design may not be mechanically feasible due to durability limitations. As a result, turbine performance may be limited by the design of the turbine blades.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine including a plurality of turbomachine blades coupled to a rotor, wherein each turbomachine blade has a blade base portion and a flared blade tip portion flared relative to the blade base portion. Additionally, a trailing edge of each turbomachine blade extends along a common plane.

In a second embodiment, a system includes a turbomachine airfoil having a base portion and a flared tip portion that is flared relative to the base portion. Furthermore, a trailing edge of the turbomachine airfoil extends entirely along a common plane.

In a third embodiment, a system includes a turbine blade including a blade base portion and a flared blade tip portion. The flared blade tip portion extends from the blade base portion and is flared relative to the blade base portion, and a trailing edge of the turbine blade extends entirely along a common plane.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
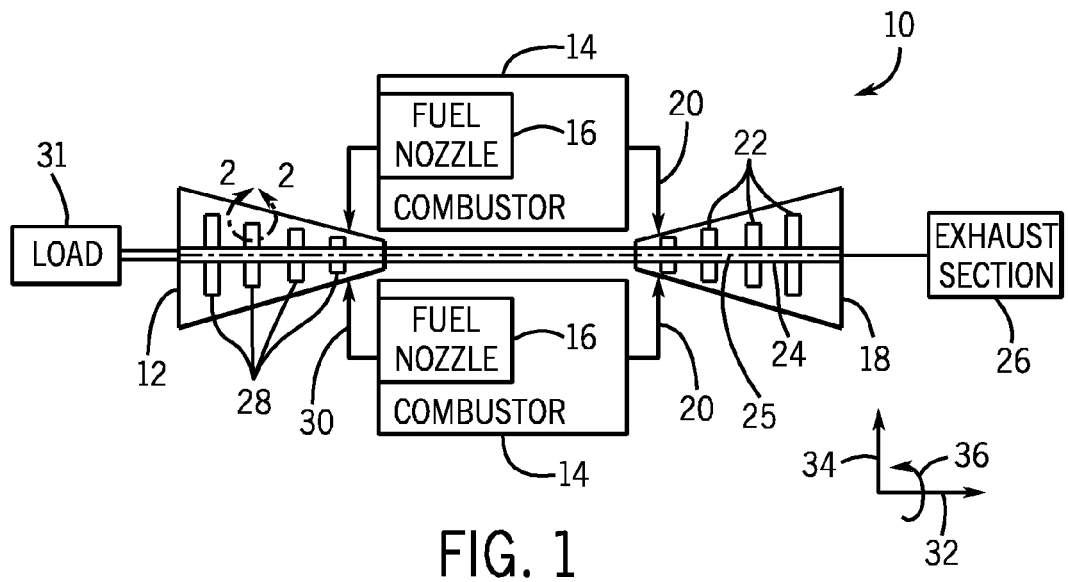
FIG. 1 is a schematic of an embodiment of a gas turbine system including a turbine having a turbine blade with a flared blade tip, where the trailing edge of the turbine blade extends along a common plane.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, certain embodiments of the present disclosure provide a turbomachine that includes turbomachine blades (e.g., airfoils) configured for enhanced aerodynamic performance and improved durability and/or longevity. For example, the turbomachine may be a turbine, such as a gas turbine or a steam turbine, having turbine blades. In other embodiments, the turbomachine may be a compressor or other turbomachine. In one embodiment, a turbine blade may include a flared blade tip portion. Specifically, the flared blade tip portion may be extended, flared, or "leaned" in a lateral direction, such as a circumferential direction and/or axial direction, relative to a blade base portion. For example, the flared blade tip portion may be flared in a direction of rotation generally around the circumference of the rotor to which the turbine blade is attached. As will be appreciated, the flared geometry of the flared blade tip portion may provide improved aerodynamic performance of the turbine blade. For example, the flared geometry of the flared blade tip portion may help reduce leakage past the turbine blade. More specifically, leakage between the turbine blade and surrounding stationary components (e.g., shrouds, housings, etc.) may be reduced. In this manner, pressure mixing and vortex flow generation may be reduced. Additionally, the entire trailing edge of the turbine blade may extend along a common plane. Specifically, as discussed in detail below, the entire trailing edge of the turbine blade may lie within a common plane defined by a spanwise average blade exit angle. In other words, the common plane may be generally tangent to a mean camber line of the turbine blade at the trailing edge. In this manner, the durability of the turbine blade and the flared blade portion may be improved.

Turning now to the drawings, FIG. 1 illustrates a block diagram of an embodiment of a gas turbine system 10 having turbine blades 22 with flared blade tip portions. Additionally, the entire trailing edge of each turbine blade 22 lies within a common plane. The system 10 includes a compressor 12, combustors 14 having fuel nozzles 16, and a turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the turbine 18. Turbine blades 22 are coupled to a rotor 24, which is also coupled to several other components throughout the turbine system 10, as illustrated. As the combustion gases 20 pass through the turbine blades 22 in the turbine 18, the turbine 18 is driven into rotation, which causes the rotor 24 to rotate along a rotational axis 25. Eventually, the combustion gases 20 exit the turbine 18 via an exhaust outlet 26.

In the illustrated embodiment, the compressor 12 includes compressor blades 28. The blades 28 within the compressor 12 are coupled to the rotor 24, and rotate as the rotor 24 is driven into rotation by the turbine 18, as discussed above. As the blades 28 rotate within the compressor 12, the blades 28 compress air from an air intake into pressurized air 30, which may be routed to the combustors 14, the fuel nozzles 16, and other portions of the gas turbine system 10. The fuel nozzles 14 may then mix the pressurized air and fuel to produce a suitable fuel-air mixture, which combusts in the combustors 14 to generate the combustion gases 20 to drive the turbine 18. Further, the rotor 24 may be coupled to a load 31, which may be powered via rotation of the rotor 24. By way of example, the load 31 may be any suitable device that may generate power via the rotational output of the turbine system 10, such as a power generation plant or an external mechanical load. For instance, the load 31 may include an electrical generator, a propeller of an airplane, and so forth. In the following discussion, reference may be made to various directions, such as an axial direction or axis 32, a radial direction or axis 34, and a circumferential direction or axis 36 of the turbine 18.

Figure 2:
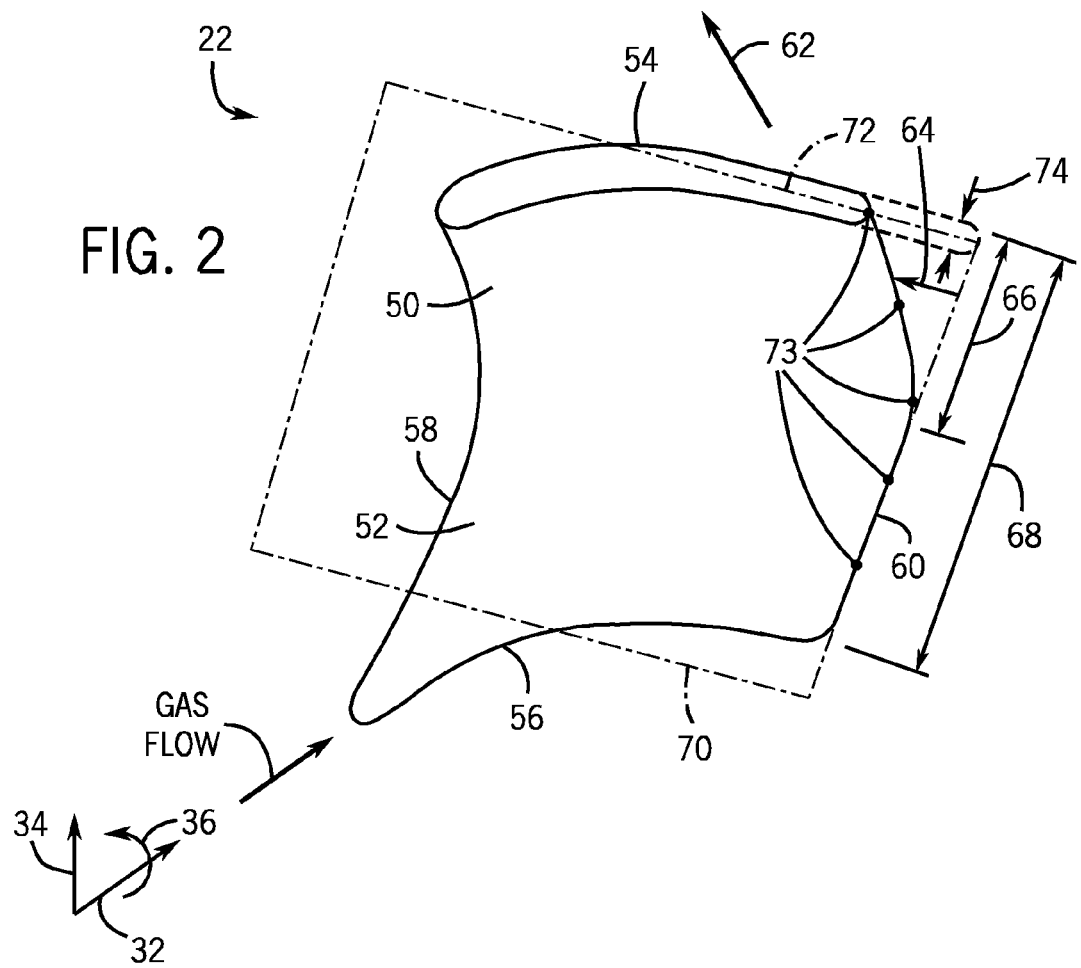
FIG. 2 is a perspective view of a turbine blade having a flared blade tip, where the trailing edge of the turbine blade extends along a common plane.

FIG. 2 is a perspective view of the turbine blade 22, illustrating a flared blade tip portion 50 and a blade base portion 52. For example, the blade base portion 52 may be an unflared blade tip portion of the turbine blade 22. In the illustrated embodiment, the turbine blade 22 also includes a blade tip surface 54, a blade root surface 56, a leading edge 58, and a trailing edge 60. As will be appreciated, the blade root surface 56 of the turbine blade 22 is coupled to the rotor 24 of the turbine 18. As shown, the flared blade tip portion 50 extends radially 34 between the blade base portion 52 and the blade tip surface 54 of the turbine blade 22. Similarly, the blade base portion 52 extends radially 34 between the flared blade tip portion 50 and the blade root surface 56 of the turbine blade 22. As shown, the flared blade tip potion 50 flares, or "leans", in a lateral direction relative to the blade base portion 50. For example, the flared blade tip portion 50 may flare at least partially in the axial direction 32 and/or the circumferential 36 direction. In other words, the flared blade tip portion 50 may flare in a direction from the trailing edge 60 toward the leading edge 58, such that the flared blade tip portion 50 extends beyond the blade base portion 52 in that direction, as indicated by arrow 64. As a result, the turbine blade 22 may experience improved aerodynamic performance. For example, the turbine blade 22 may experience reduced flow leakage between the turbine blade 22 and surrounding stationary components (e.g., shrouds, housings, etc). In this manner, pressure mixing and vortex flow generation may be reduced.

As will be appreciated, the amount of flaring of the turbine blade 22 may vary. That is, a height 66 of the flared blade tip portion 50 relative to a total height 68 of the turbine blade 22 may vary. For example, the height 66 of the flared blade tip portion 50 may be approximately 1 to 90, 2 to 80, 3 to 70, 4 to 60, 5 to 50, 6 to 40, 7 to 30, 8 to 20 or 9 to 10 percent of the total height 68 of the turbine blade 22. In other embodiments, the height 66 of the flared blade tip portion 50 may be 5 to 50, 10 to 40, or 15 to 25 percent of the total height 68 of the turbine blade 22.

As mentioned above, the entire trailing edge 60 of the turbine blade 22 is within a common plane 70. The common plane 70 is defined by a mean camber line 72 of the turbine blade 22 at the trailing edge 60 at each point (e.g., points 73) along the trailing edge 60. More specifically, the common plane 70 is tangent to the mean camber line 72 at the trailing edge 60. As will be appreciated, the mean camber line 72 at the trailing edge 60 may be defined by a spanwise average 74 of the turbine blade 22 at the trailing edge 60. Because the entire trailing edge 60 of the turbine blade 22 lies within the common plane 70, the entire trailing edge 60 is generally aligned in the radial 34 direction. In this manner, the mechanical design of the turbine blade 22 with the flared blade portion 50 may have improved durability and/or longevity.

Figure 3:
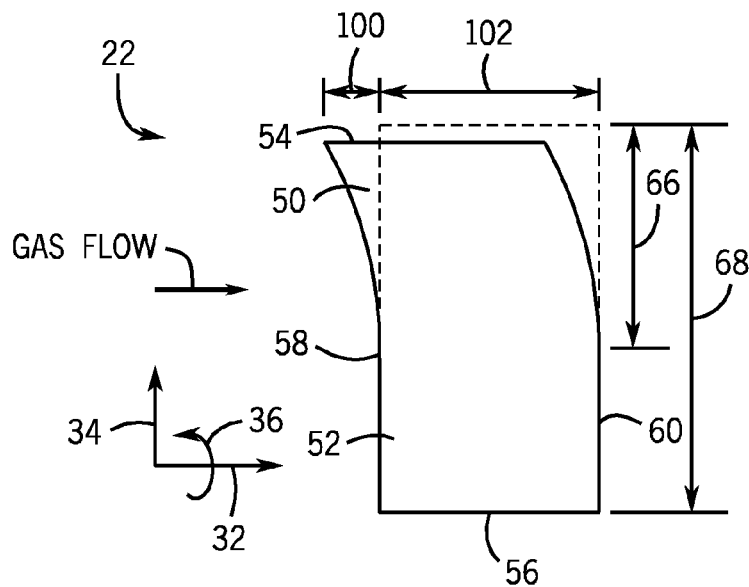
FIG. 3 is a side view of a turbine blade having a flared blade tip, where the trailing edge of the turbine extends along a common plane.

FIG. 3 is a side view of the turbine 22, illustrating the flared blade tip portion 50 and the blade base portion 52 (e.g., the unflared blade tip portion), where the entire trailing edge 60 of the turbine blade 22 lies within the common plane 70. In the illustrated embodiment, the flared blade tip portion 50 is flared at least partially in the axial 32 direction and the circumferential 36 direction. However, in certain embodiments, the flared blade tip portion 50 may be flared in the circumferential 36 direction, or the axial 32 direction, or both the circumferential 36 and the axial 32 direction. As will be appreciated, the direction of the flare or "lean" of the flared blade tip portion 50 may be selected to achieve a desired aerodynamic performance or improvement. Regardless of the direction of the flare or "lean" of the flared blade tip portion 50, the entire trailing edge 60 extends within the common plane 70, as described above. As a result, the durability and/or longevity of the turbine blade 22 with the flared blade tip portion 50 may be improved.

As mentioned above, the amount of flaring of the turbine blade 22 may vary. In other words, the height 66 of the flared blade tip portion 50 relative to a total height 68 of the turbine blade 22 may vary. For example, the height 66 of the flared blade tip portion 50 may be greater than or equal to approximately 5, 10, 15, 20, 25, 30, 35, 40, 45, or 50 percent of the total height 68 of the turbine blade 22. Additionally, the amount of flare or "lean" of the flared blade tip portion 50 in the axial 32 direction and/or circumferential 36 direction may vary. Specifically, in the illustrated embodiment, the flared blade tip portion 50 flares a distance 100 of a total width 102 of the turbine blade 22 between the leading and trailing edges 58 and 60 (e.g., measured at the blade base portion 52). In certain embodiments, the distance 100 may be 1 to 50, 2 to 45, 3 to 40, 4 to 35, 5 to 30, 6 to 25, 7 to 20, 8 to 15 or 9 to 10 percent of the total width 102 of the turbine blade 22.

Figure 4:
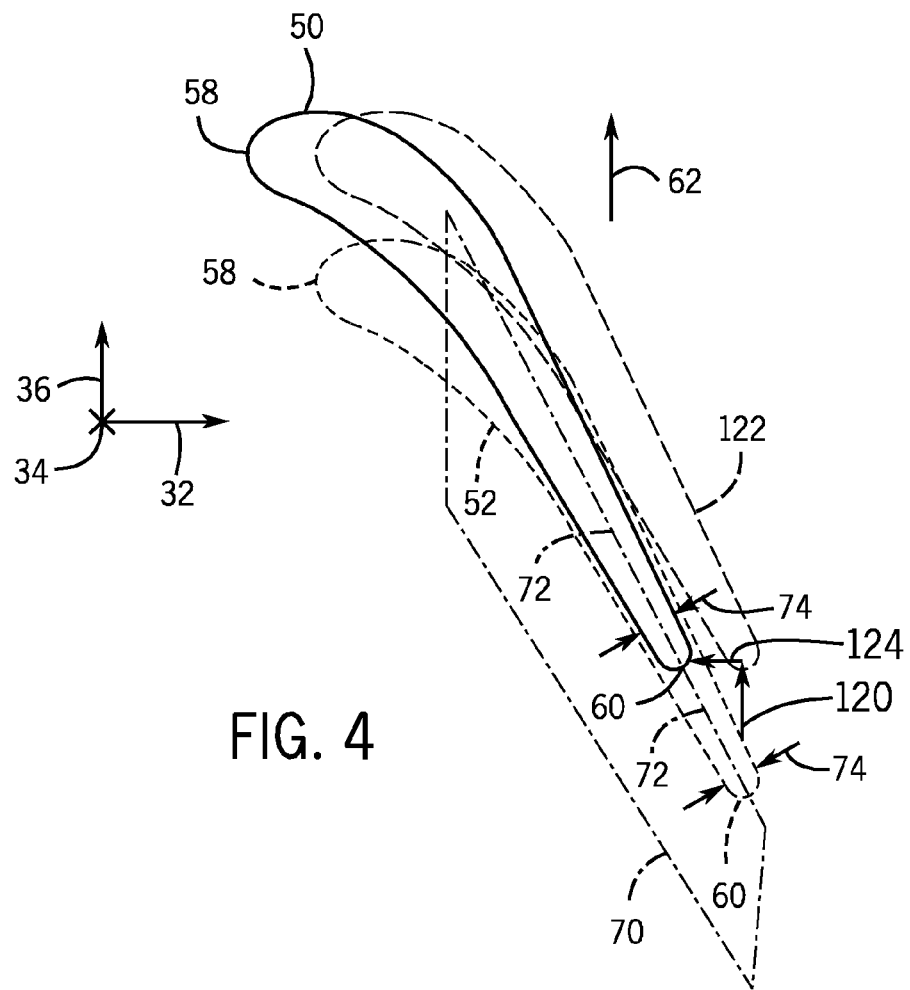
FIG. 4 is a schematic illustrating a flared blade tip portion of a turbine blade and a blade base portion of a turbine blade, illustrating the trailing edge of the turbine blade extending along a common plane.

FIG. 4 is a schematic of the flared blade tip portion 50 of the turbine blade 22 and the blade base portion 52 (e.g., the unflared blade tip portion) of the turbine blade 22, illustrating the trailing edge 60 of the turbine blade 22 within the common plane 70. Specifically, the flared blade tip portion 50 is flared relative to the blade base portion 52. In the illustrated embodiment, the flared blade tip portion 50 is flared in the axial 32 direction and the circumferential 36 direction. More specifically, as indicated by arrow 120, the flared blade tip portion 50 is flared, or shifted, in the circumferential direction 36. Without any additional flare, the flared blade tip portion 50 would be located in the position indicated by dashed line 122. However, as shown, the flared blade tip portion 50 is further flared, or shifted, in the axial 32 direction, as indicated by arrow 124. More particularly, the flared blade tip portion 50 is flared in the axial 32 direction such that the trailing edge 60 of the flared blade tip portion 50 is aligned with the trailing edge 60 of the blade base portion 52. Specifically, in the manner described above, the trailing edge 60 of the flared blade tip portion 50 and the trailing edge 60 of the blade base portion 52 lie within the common plane 70 defined by the mean camber line 72 at each point along the trailing edge 60. As discussed above, the common plane 70 is tangent to the mean camber line 72, which may be defined by the spanwise average 74 of the turbine blade 22 at the trailing edge 60. In this manner, the aerodynamic performance of the turbine blade 22 may be improved while maintaining a feasible mechanical design. More specifically, flow leakage between the turbine blade 22 and surrounding stationary components (e.g., housings, shrouds, etc.) may be reduced, while the durability and/or longevity of the turbine blade 22 may be increased.

As discussed above, embodiments of the present disclosure are directed toward a turbine blade 22 having a flared blade tip portion 50 and a blade base portion 52 (e.g., an unflared blade tip portion). Specifically, the flared blade tip portion 50 may be flared, or "leaned", in the axial 32 direction, the circumferential 36 direction, or both the axial 32 and the circumferential 36 directions, wherein the entire trailing edge 60 of the turbine blade 22 is aligned in a common plane 70. In this manner, the aerodynamic performance of the turbine blade 22 may be improved. For example, flow leakage between the turbine blade 22 and surrounding stationary components (e.g., shrouds, housings, etc.) may be reduced, thereby reducing pressure mixing and vortex flow generation. The common plane 70 is at least partially defined by a mean camber line 72 of the turbine blade 22 at each point along the trailing edge 60. The mean camber line 72 may be defined by the spanwise average 74 of the turbine blade 22 at the trailing edge 60. Due to the alignment of the entire trailing edge 60 in the common plane 70, the mechanical design of the turbine blade 22 may provide improved durability and/or longevity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine, comprising:
a plurality of turbomachine blades coupled to a rotor, wherein each turbomachine blade of the plurality of turbomachine blades comprises an unflared blade base portion extending a first axial length of the turbomachine blade and a flared blade tip portion flared relative to the unflared blade base portion and extending a second axial length of the turbomachine blade, wherein a trailing edge of each turbomachine blade of the plurality of turbomachine blades extends along a common plane, the trailing edge of each turbomachine blade of the plurality of turbomachine blades is nonlinear, and the flared blade tip portion is flared at least partially in an axially forward direction relative to a rotational axis of the turbomachine.

2. The system of claim 1, wherein the flared blade tip portion is flared away from the trailing edge of the unflared blade base portion.

3. The system of claim 1, wherein the second axial length is at least 20 percent of a total length of the turbomachine blade.

4. The system of claim 1, wherein the flared blade tip portion is flared at least partially in a circumferential direction relative to the rotational axis of the turbomachine.

5. The system of claim 1, wherein the circumferential direction is a rotating direction of the turbomachine.

6. The system of claim 1, wherein the common plane is at least partially defined by a mean camber line of each turbomachine blade of the plurality of turbomachine blades at the trailing edge of the turbomachine blade.

7. The system of claim 6, wherein the mean camber line of each turbomachine blade of the plurality of turbomachine blades at the trailing edge of the turbomachine blade is defined by a spanwise average of the turbomachine blade at the trailing edge.

8. The system of claim 1, wherein the turbomachine comprises a gas turbine.

9. The system of claim 1, wherein the flared blade tip portion is flared away from the trailing edge of the unflared blade base portion, the flared blade tip portion is flared at least partially in a rotating direction of the turbomachine, and the common plane is at least partially defined by a mean camber line of each turbomachine blade of the plurality of turbomachine blades at the trailing edge of the turbomachine blade.

10. A system, comprising:
a turbomachine airfoil comprising an unflared base portion extending a first axial length of the turbomachine airfoil and a flared tip portion that is flared relative to the unflared base portion and extends a second axial length of the turbomachine airfoil, wherein a trailing edge of the turbomachine airfoil extends entirely along a common plane, the trailing edge of the turbomachine airfoil is nonlinear, and the flared tip portion is flared at least partially in an axially forward direction relative to a turbomachine rotational axis.

11. The system of claim 10, wherein the flared tip portion is flared away from the trailing edge of the base portion.

12. The system of claim 10, wherein the second axial length is at least 20 percent of a total length of the turbomachine airfoil.

13. The system of claim 10, wherein the flared tip portion is flared at least partially in a circumferential direction relative to the turbomachine rotational axis.

14. The system of claim 10, wherein the common plane is at least partially defined by a mean camber line of the turbomachine airfoil at the trailing edge of the turbomachine airfoil.

15. The system of claim 10, wherein the flared tip portion is flared in a rotational direction relative to the turbomachine rotational axis, the flared tip portion is flared away from the trailing edge of the base portion, and the common plane is at least partially defined by a mean camber line of the turbomachine airfoil at the trailing edge of the turbomachine airfoil.

16. The system of claim 15, comprising a turbomachine having the turbomachine airfoil.

17. A system, comprising:
a turbine blade comprising an unflared blade base portion extending a first axial length of the turbine blade and a flared blade tip portion extending a second axial length of the turbine blade, wherein the flared blade tip portion extends from the unflared blade base portion and is flared relative to the unflared blade base portion, a trailing edge of the turbine blade extends entirely along a common plane, the trailing edge is nonlinear, and the flared blade tip portion is flared at least partially in an axially forward direction relative to a turbine rotational axis.

18. The system of claim 17, wherein the common plane is defined by mean camber lines of the turbine blade at each point along the trailing edge of the turbine blade.

19. The system of claim 17, wherein the common plane is defined by a spanwise average of the turbine blade at each point along the trailing edge of the turbine blade.

20. The system of claim 17, comprising a turbine having a rotor coupled to the turbine blade.

* * * * *